United States Patent [19]
Satou

[11] Patent Number: 5,619,736
[45] Date of Patent: Apr. 8, 1997

[54] CAMERA EQUIPPED WITH A LAMP LIGHTING CONTROLLING DEVICE

[75] Inventor: Kouji Satou, Miyagi, Japan

[73] Assignee: Nikon Corporation, Tokyo, Japan

[21] Appl. No.: 517,974

[22] Filed: Aug. 22, 1995

[30] Foreign Application Priority Data

Sep. 7, 1994 [JP] Japan .................................. 6-214092

[51] Int. Cl.$^6$ .................................................. G03B 7/00
[52] U.S. Cl. ........................................ 396/164; 396/205
[58] Field of Search ............................... 354/413, 415, 354/137

[56] References Cited

U.S. PATENT DOCUMENTS

| | | | |
|---|---|---|---|
| 3,438,766 | 4/1969 | Biber | 354/415 |
| 4,592,639 | 6/1986 | Nakamura | 354/137 |
| 4,999,663 | 3/1991 | Nakamura | 354/415 |
| 5,115,169 | 5/1992 | Aoki | 354/145.1 |
| 5,313,247 | 5/1994 | Hosomizu et al. | 354/415 |
| 5,491,533 | 2/1996 | Sakamoto | 354/415 |
| 5,508,780 | 4/1996 | Hara et al. | 354/415 |

*Primary Examiner*—Safet Metjahic
*Assistant Examiner*—Michael Dalakis
*Attorney, Agent, or Firm*—Oliff & Berridge

[57] ABSTRACT

A camera is provided that is equipped with a lamp lighting controlling device that does not require a complicated circuit structure and that does not shorten the life of batteries and lamps. The camera is equipped with a lamp lighting controlling device that lights a lamp before the shutter release operation in order to alleviate red eye. The camera includes an electrical current controlling device that carries out a pulse electrical current control to repeatedly connect and disconnect the electrical current to the lamp and a clocking device that clocks a first time interval before the shutter release operation commences and a second time interval that immediately follows the first time interval. The electrical current controlling device lights the lamp with the largest stationary duty value during the second time interval and lights the lamp with an initial duty value during the first time interval. The initial duty value is smaller than the stationary duty value.

18 Claims, 6 Drawing Sheets

CAMERA EQUIPPED WITH A LAMP LIGHTING CONTROLLING DEVICE

BACKGROUND OF THE INVENTION

1. Field of the Invention

The present invention relates to a camera equipped with a lamp lighting controlling device that lights a lamp to alleviate red eye.

2. Description of Related Art

Figure 4:
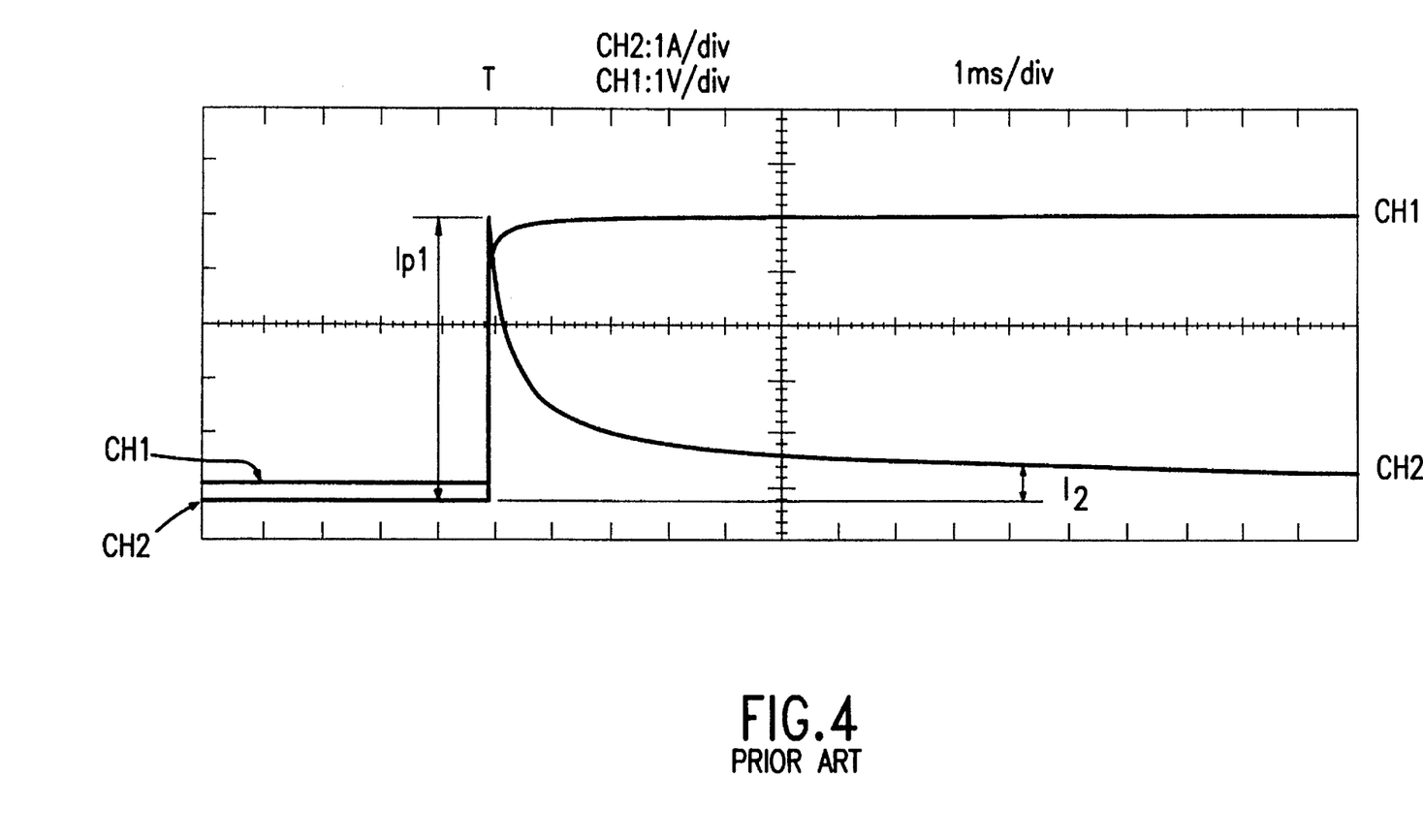
FIG. 4 is a drawing showing the rush current when conventional stationary voltage driving is used and FIG. 5 is a drawing showing the rush current according to the present invention
Figure 6:
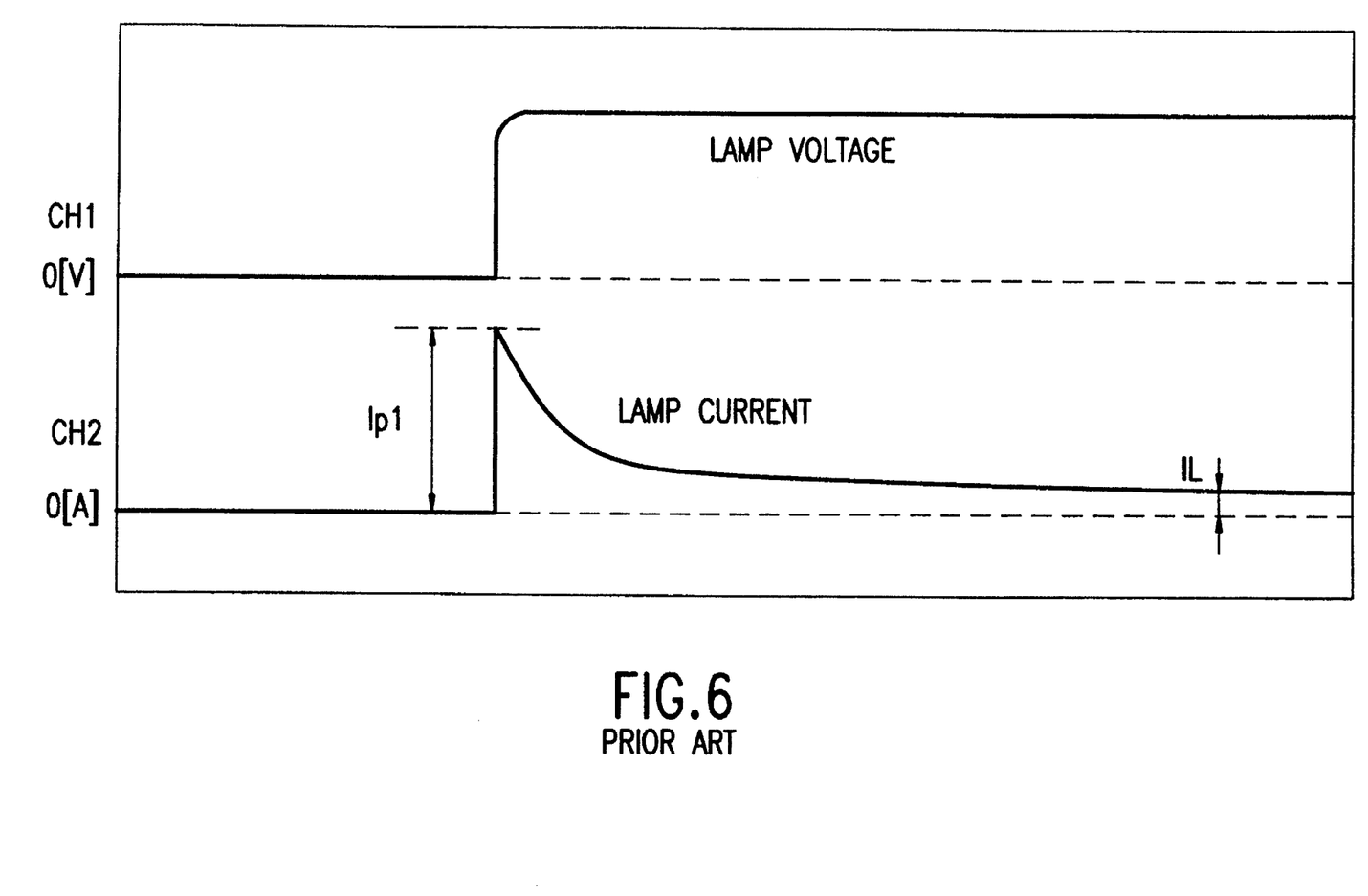
FIG. 6 is a draw showing the fixed voltage and rush current of FIG. 4, separated for clarity.

Lamps are generally used as a light emitting device to alleviate camera red eye. Since red eye alleviation lamps are generally lit by conventional fixed-voltage drives, when electrical current is repeatedly passed to the lamp as shown in FIGS. 4 and 6 a rush value IP1 of eight to ten times the stationary current IL flows to the lamp directly after the flow of the electrical current. This weakens the lamp and drastically influences the life of the lamp. In addition, the electrical source voltage of the MCU that controls the circuit system through the rush current varies to cause abnormal resetting of the MCU. This may also cause adverse affects on the MCU operation. To control this rush current, stationary current driving may be employed or the system may be preheated by applying a current of 20% of the rated capacity while the lamp is not lit.

However, in systems (such as cameras) that use batteries as the electrical source, when current is applied while the lamp is not lit as described above, the expended current increases to shorten the battery life. If stationary current driving is employed, it is necessary to construct a new stationary current circuit. This increases the number of circuit components, which is undesirable because of space utilization. Furthermore, the lighting commencement becomes sluggish.

SUMMARY OF THE INVENTION

It is an object of the invention to provide a camera equipped with a lamp lighting controlling device that does not require a complicated circuit structure and that does not shorten the life of batteries and lamps.

This invention provides a camera equipped with a lamp lighting controlling device that lights a lamp before a shutter release operation commences. The camera includes an electrical current controlling device that controls a pulse electrical current that repeatedly connects and disconnects the electrical current to the lamp and a clocking device that clocks a first time interval and a second time interval that immediately follows the first time interval. The electrical current controlling device is provided with a lamp light controlling device that lights the lamp with the largest stationary duty value during the second time interval and that lights the lamp with an initial duty value during the first time interval. The initial duty value is smaller than the stationary duty value.

The initial duty value may also increase from a first duty value to a second duty value within the first time interval.

Further, the driving interval of the first duty value is set to become an electrical current value that is twice the stationary current when the peak electrical current generated at the first duty value changes from the first duty value to the second duty value.

Still further, the interval in each cycle during which the electrical current is on sets the pulse cycle and the first duty value so that the peak electrical current generated during each cycle will be a value smaller than the peak value of the rush current generated by direct current.

Even still further, the pulse cycle and the first duty value are set so that the peak electrical current during the interval in which the electrical current is on in the first cycle of the cycles obtained through the first duty value becomes ⅔ of the peak value of the rush current generated in the case of direct current.

The first time interval is set to be a time interval that exceeds a time interval that shows the rush current generated by direct current is a larger value than the stationary current.

Because the lamp lighting time interval can be divided into two time zones and separate duty values can be set for each zone, the effective value of the initial rush current during lighting can be decreased while maintaining the irradiation intensity necessary for steady time. This prevents a decrease in battery life and detrimental influences on circuit operation.

By gradually increasing the duty value of the initial first time zone during lighting of the lamp as the time interval progresses, the time interval required for the lamp filament to reach a stationary range will be quicker than when driving at a fixed duty value. By setting the driving interval of the first duty value to decrease to twice the stationary current when the peak electrical current driven at the first duty value changes to the second duty value, the lighting condition can move smoothly even if the device enters driving at the second duty value. By setting the pulse cycle and the initial duty value of the lighting to be less than the peak value of the rush current generated with direct current, the rush current can be controlled directly after the lamp lighting commencement, the life of the lamp can be prolonged, and abnormal reset of the MCU, which controls the circuit system, and other adverse influences on the operation can be prevented.

Still further, by setting the pulse cycle and the duty value directly after lighting commencement so that the peak electrical current during the interval in which the electrical current is on in the first cycle after lighting commencement becomes ⅔ of the peak value of the rush current generated by direct current, an appropriate time interval can be obtained without unnecessarily prolonging the energy supply time interval required to reach the stationary condition. By setting the first time interval in which driving is carried out at a low duty value to be a time interval that exceeds a time interval in which a rush current flows, the energy supply time interval required for the filament to reach a stationary condition can be maintained and the transition to stationary current can be made smoothly.

Other objects, advantages and salient features of the invention will become apparent from the detailed description taken in conjunction with the annexed drawings, which disclose preferred embodiments of the invention.

BRIEF DESCRIPTION OF DRAWINGS

The invention will be described with reference to the following drawings in which like reference numerals refer to like elements and wherein.

DETAILED DESCRIPTION OF PREFERRED EMBODIMENTS

Figure 1:
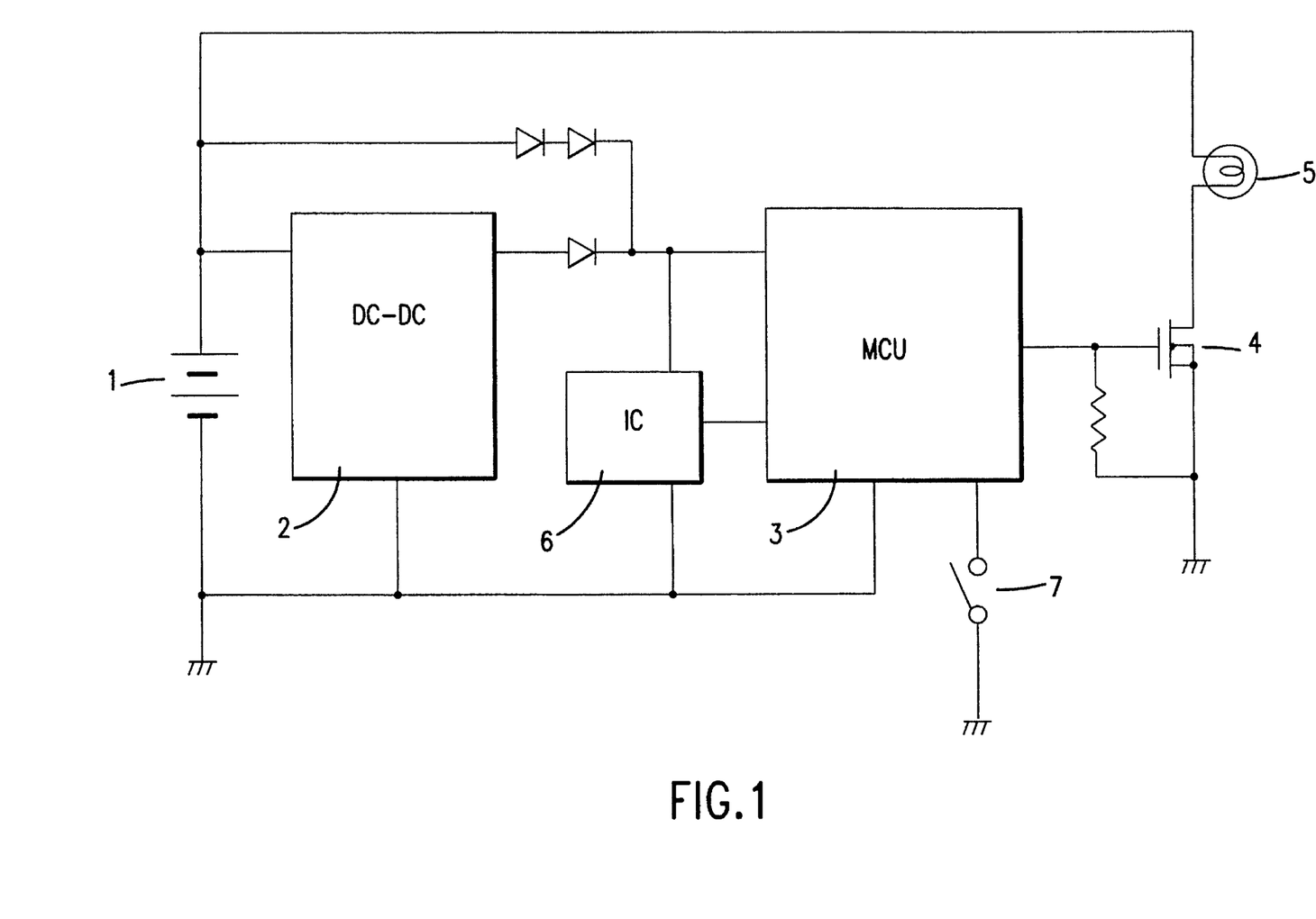
FIG. 1 is a block diagram of the lamp driving circuit according to the present invention.

FIG. 1 is a block diagram of a lamp driving circuit according to the present invention. The battery 1 is an electrical source battery that supplies the electrical source to the lamp driving circuit. The DC-DC converter 2 is an electrical source supply source for the MCU 3 and for the circuit system of the camera. The MCU 3 is a device that carries out lighting drive controlling of the red eye alleviation lamp 5, which will be described below. The MCU 3 includes a timer to clock the time interval when lighting is controlled. The MOSFET 4 is turned ON and OFF by the MCU 3 to light and extinguish the red eye alleviation lamp 5.

The red eye alleviation lamp 5 is a lamp that irradiates toward the subject before the light emission from a flash device (not shown). The red eye alleviation lamp is used to alleviate the red eye phenomenon caused by the light emissions from the flash device.

The reset IC 6 detects reductions in the electrical source voltage of the MCU 3 and resets the MCU 3 when the electrical source voltage goes below a specified value. The release switch 7 is turned on by fully depressing a release button (not shown).

A voltage that has dropped two VF levels of a diode from the voltage of the battery 1 and a voltage that has dropped one VF level of a Schottkey diode from the output voltage of the DC-DC converter 2 are supplied by an OR gate to the MCU 3. The MCU 3 outputs a signal for driving the red eye alleviation lamp 5. The release switch 7 commences one cycle of the camera sequence when the release switch 7 is turned on. The red eye alleviation lamp 5 is connected between the drain of the MOSFET 4 and the battery 1. The gate of the MOSFET 4 is directly connected to the MCU 3. It is understood to those skilled in the art that the above connections are merely illustrative and not limiting. That is, other embodiments are within the scope of this invention.

Figure 2:
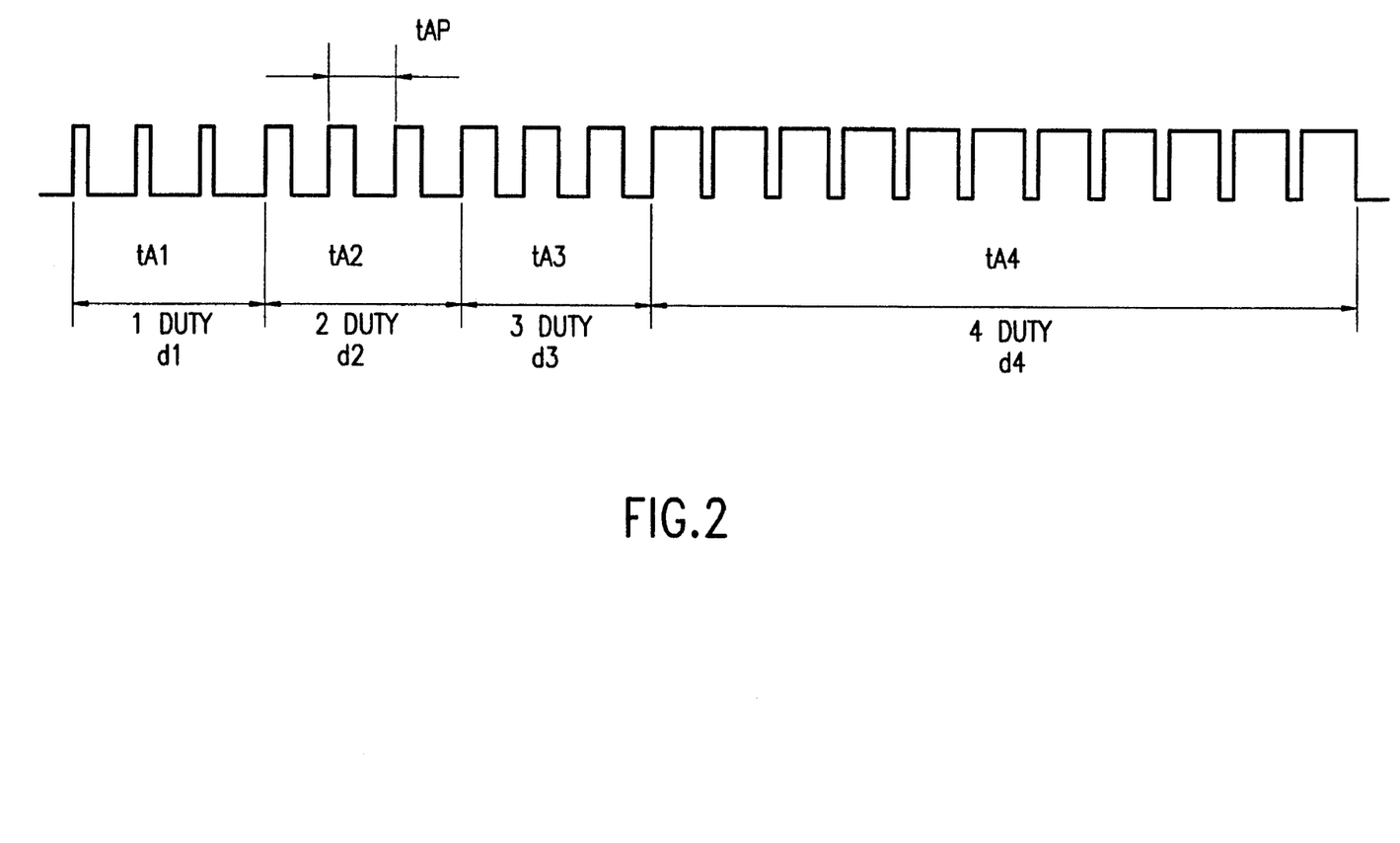
FIG. 2 is a timing chart showing the PWM current pattern according to the present invention.

FIG. 2 is a timing chart of the PWM current pattern by which the MCU 3 controls the MOSFET 4. The PWM current pattern according to this embodiment is divided into four duty divisions as shown in FIG. 2.

The time interval of the first duty division is tA1 and the duty is d1. The time interval of the second duty division is tA2 and the duty is d2. The time interval of the third duty division is tA3 and the duty is d3. Finally, the time interval of the fourth duty division is tA4 and the duty is d4. The time interval tA1 of the first duty division is set to be the interval over which the peak current value becomes approximately twice that of the stationary current. Time intervals tA2 and tA3 are set so that the lamp lighting condition reaches a stationary irradiation intensity without a sense of incompatibility. The time interval tA4 is set so that red eye will be effectively alleviated and so that the transition to the mechanical sequence will be smooth.

The PWM current cycle tAP and duty d1 of the first duty division are set so that peak current of the first cycle will become ⅔ of the peak value of the rush current when direct current flows. The PWM current cycle tAP is fixed from beginning to end of the lighting.

One example of the time intervals and duties of each of the above divisions is as follows:

tA1=6 ms, tA2=20 ms, tA3=100 ms, tA4=750 ms d1=20%, d2=40%, d3=60%, d4=80% tAP:19 μs (fixed)

Figure 3:
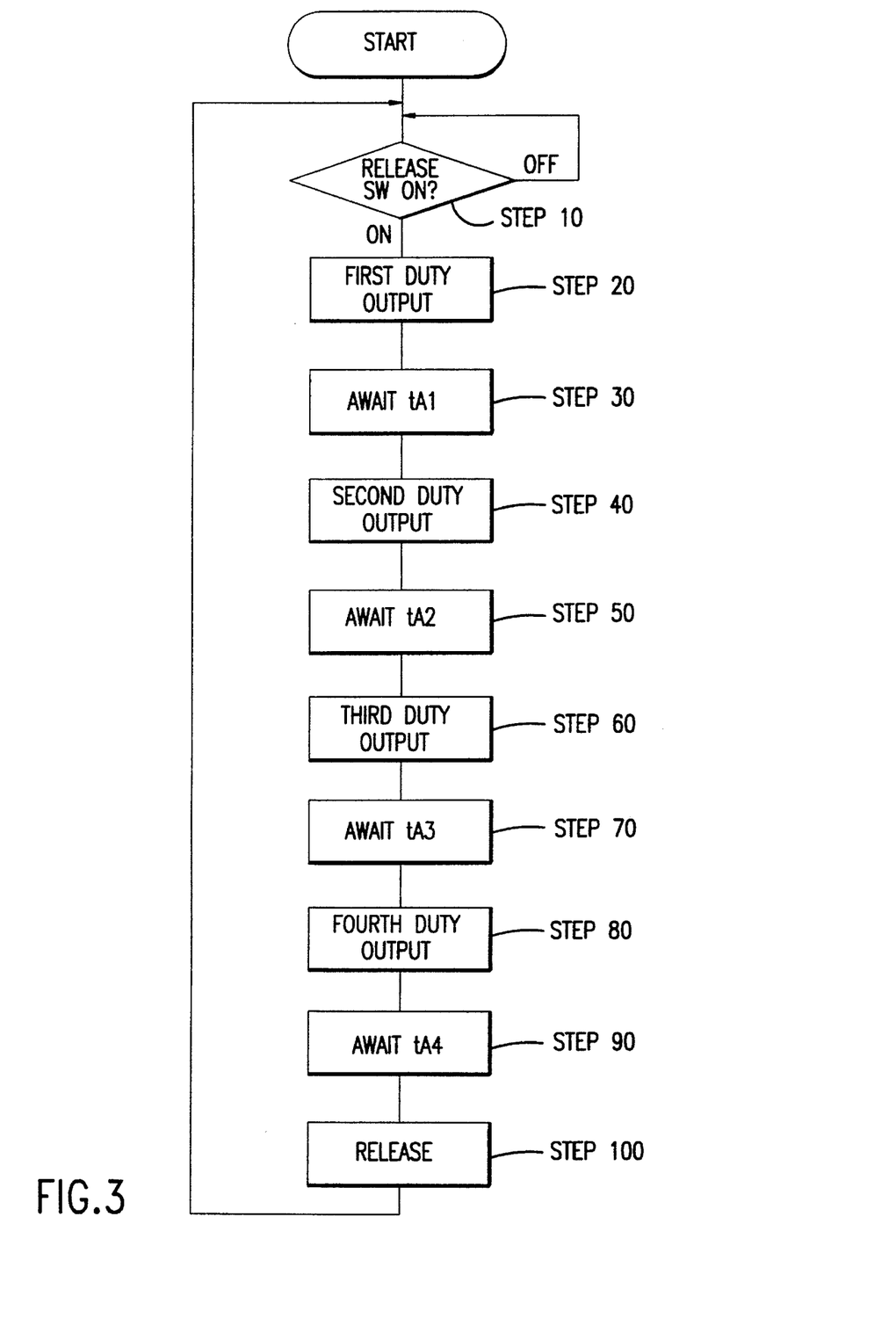
FIG. 3 is a flow chart showing the lighting of the red eye alleviation lamp by the MCU according to the present invention.

FIG. 3 is a flow chart showing a method of the lighting the red eye alleviation lamp 5 through the MCU 3. When the DC-DC converter 2 is in the activated condition and the release switch 7 is closed, lighting of the red eye alleviation lamp 5 is carried out following the method described in FIG. 3. This is preferably done by software in the MCU 3. Control of the lighting of the red eye alleviation lamp 5 will be described below.

In step 10, the state of the release switch 7 is detected. If the release switch 7 is ON, the program proceeds to step 20. If the release switch 7 is not ON, the program repeats step 10. In step 20, the red eye alleviation lamp 5 is lit by the first duty output d1. In step 30, the driving time interval tA1 for the first duty is clocked. When a specified time has elapsed, the program proceeds to step 40.

The lighting of the red eye alleviation lamp 5 is changed from the first duty output d1 to the second duty output d2 in step 40. Then, the driving time interval tA2 for the second duty is clocked in step 50, and when a specified time has elapsed, the program proceeds to step 60.

The lighting of the red eye alleviation lamp 5 is changed in step 60 from the second duty output d2 to the third duty output d3. The driving time interval tA3 for the third duty is clocked in step 70. When a specified time has elapsed, the program proceeds to step 80.

In step 80, the lighting of the red eye alleviation lamp 5 is changed from the third duty output d3 to the fourth duty output d4. Then, the driving time interval tA4 for the fourth duty is clocked in step 90, and when a specified time has elapsed the program proceeds to step 100. Finally, in step 100, photography is commenced through a commonly known release sequence.

The reason the rush current generated directly after the commencement of current flow is controlled by the lighting of the red eye alleviation lamp 5 will be described with respect to FIG. 5.

Figure 5:
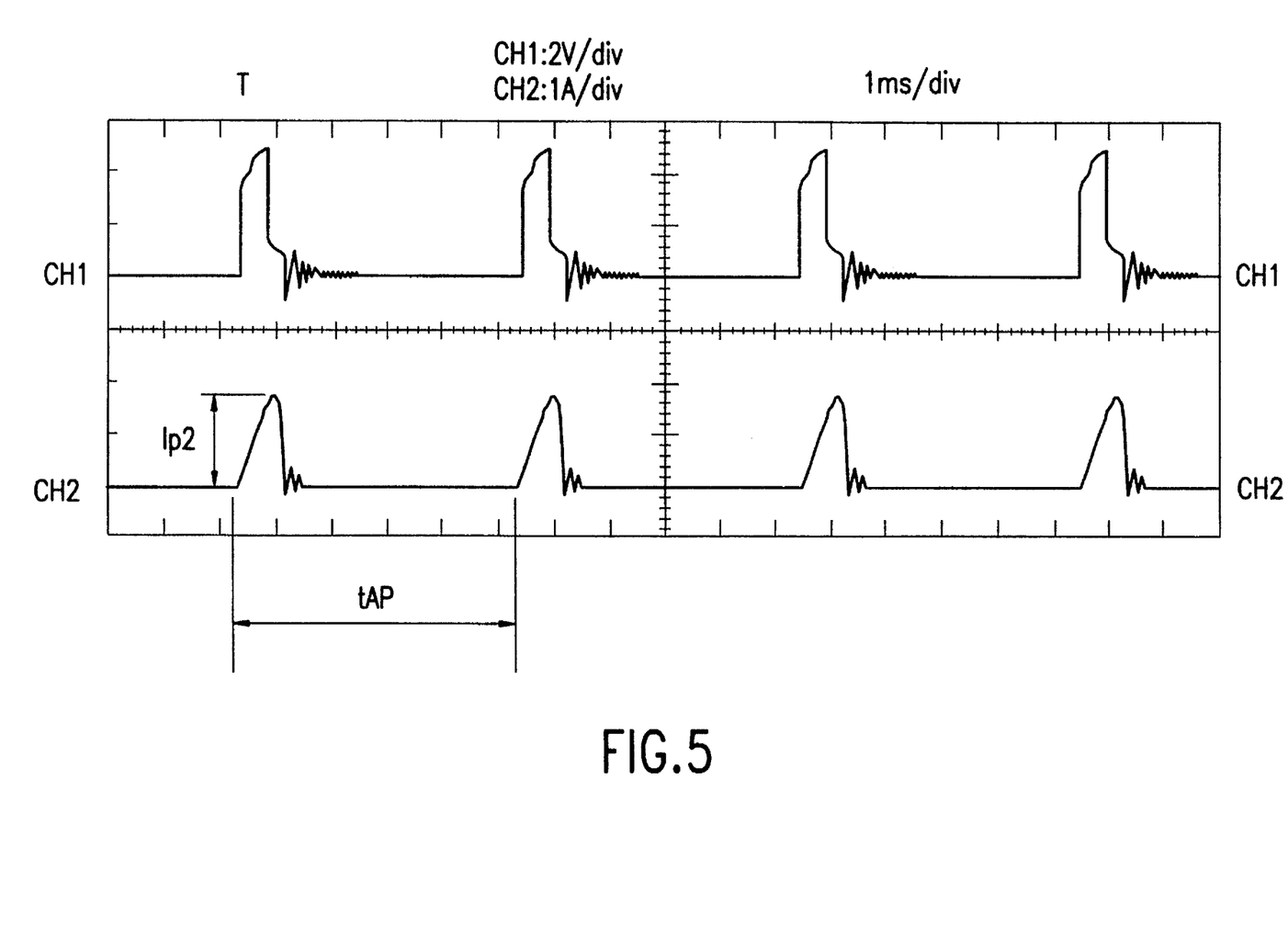

The wave form shown in FIG. 5 shows three cycles of the first duty division. By stopping the current flow to the red eye alleviation lamp 5 with a timing that is quicker than that required for the rush current to reach the peak value, the peak value is restricted to the peak current IP2, which is lower than the peak current IP1 (see FIGS. 4 and 6) that occurs when the current flow is not stopped. By repeating the starting and stopping of the current flow at a high frequency, the temperature of the filament of the red eye alleviation lamp 5 increases gradually and reaches a stationary range.

As described above, by controlling the rush current directly after the commencement of the flow of current to the lamp the life of the lamp can be prolonged and adverse influences on the operation of the MCU can be prevented.

When compared with methods in which stationary current driving is performed, the number of circuit components can be decreased. Thus, the present invention is both cost effective and space effective.

Because the lamp lighting time interval can be divided into two time zones and separate duty values can be set for each zone, the effective value of the initial rush current during lighting can be decreased while maintaining the irradiation intensity necessary for stationary current. This can prevent a decrease in battery life and detrimental influences on circuit operation.

Additionally, by gradually increasing the duty value of the initial first time zone during lighting of the lamp as the time interval progresses, the time interval required for the condition of the lamp filament to reach a stationary range will be quicker than when driving is carried out at a fixed duty value.

Still further, by setting the driving interval of the first duty value so as to decrease to twice the stationary current when the peak electrical current driven at the first duty value changes to the second duty value, the lighting condition can move smoothly even if the device enters driving at the second duty value.

By setting the pulse cycle and the initial duty value of the lighting so as to be less than the peak value of the rush current generated in the case of direct current, the rush current directly after the lamp lighting commencement can be controlled and the life of the lamp can be prolonged. Also, abnormal resetting of the MCU and other adverse influences can be prevented.

Even still further, by setting the pulse cycle and the duty value directly after lighting commencement so that the peak electrical current during the interval in which the electrical current is on in the first cycle after lighting commencement becomes 2/3 of the peak value of the rush current generated in the case of direct current, an appropriate time interval can be obtained without unnecessarily prolonging the energy supply time interval required to reach the stationary condition.

By setting the first time interval in which driving is carried out at a low duty value to be a time interval that exceeds a time interval in which a rush current flows which is larger than the stationary current, the energy supply time interval required for the filament reach a stationary condition can be maintained and the transition to stationary current can be made smoothly.

While the invention has been described in relation to preferred embodiments, many modifications and variations are apparent from the description of the invention, and all such modifications and variations are intended to be within the scope of the present invention as defined in the appended claims.

What is claimed is:

1. A camera equipped with a lamp lighting controlling device that lights a lamp to alleviate red eye before a shutter release operation commences, the camera comprising:

an electrical current controlling device that performs pulse electrical current control to repeatedly connect and disconnect electrical current to the lamp; and a clocking device that clocks a first time interval before the shutter release operation commences and a second time interval that immediately follows the first time interval, wherein the electrical current controlling device lights the lamp with a stationary duty value during the second time interval, said stationary duty value having a largest duty value, and the electric current controlling device lights the lamp with an initial duty value during the first time interval, the initial duty value being smaller than the stationary duty value.

2. The camera of claim 1, wherein the initial duty value gradually increases within the first time interval from a first duty value to a second duty value.

3. The camera of claim 2, wherein a driving interval of the first duty value is set so an electrical current value is approximately twice the stationary current when the peak electrical current generated at the first duty value changes from the first duty value to the second duty value.

4. The camera of claim 2, wherein during each cycle during which the electrical current is on, each interval sets a pulse cycle and the first duty value so that peak electrical current generated during said each cycle will be a value smaller than a peak value of rush current generated by the application of fixed voltage.

5. The camera of claim 4, wherein the pulse cycle and the first duty value are set so that the peak electrical current during the interval in which the electrical current is on becomes 2/3 of the peak value of the rush current generated by the application of fixed voltage.

6. The camera of claim 1, wherein the first time interval is a time interval that exceeds a time interval which shows that rush current generated by the application of fixed voltage is a larger value than stationary current.

7. A camera equipped with a lamp lighting controlling device that lights a lamp before a shutter release operation, the camera comprising:

current control means for connecting and disconnecting electric current to the lamp; and timing means for timing a first time interval before the shutter release operation commences and a second time interval immediately following the first time interval, the current control means lighting the lamp with a stationary duty value during the second time interval, said stationary duty value having a largest duty value, and the current control means lighting the lamp with an initial duty value during the first time interval, the initial duty value being less than the stationary duty value.

8. The camera of claim 7, wherein the initial duty value gradually increases within the first time interval from a first duty value to a second duty value.

9. The camera of claim 8, wherein a driving interval of the first duty value is set so an electrical current value is approximately twice the stationary current when the peak electrical current generated at the first duty value changes from the first duty value to the second duty value.

10. The camera of claim 8, wherein during each cycle that the electric current is on, each interval sets a pulse cycle and the first duty value so that peak electrical current generated during said each cycle will be a value smaller than a peak value of rush current generated by the application of fixed voltage.

11. The camera of claim 10, wherein the pulse cycle and the first duty value are set so that the peak electrical current during the interval in which the electrical current is on becomes 2/3 of the peak value of the rush current generated by the application of fixed voltage.

12. The camera of claim 7, wherein the first time interval is a time interval that exceeds a time interval which shows that rush current generated by the application of fixed voltage is a larger value than stationary current.

13. A method of lighting a light in a camera to alleviate red eye before a shutter release operation commences, the method comprising the steps of:

lighting the lamp with an initial duty value during a first time interval; and lighting the lamp with a stationary duty value during a second time interval that immediately follows the first time interval, said stationary duty value having a largest duty value, the initial duty value being smaller than the stationary duty value.

14. The method of claim 13, where the initial duty value gradually increases within the first time interval from a first duty value to a second duty value.

15. The method of claim 14, wherein a driving interval of the first duty value is set so an electrical current value is approximately twice the stationary current when the peak electrical current generated at the first duty value changes from the first duty value to the second duty value.

16. The method of claim 14, wherein during each cycle during which the electrical current is on, each interval sets a pulse cycle and the first duty value so that peak electrical current generated during said cycle will be a value smaller than a peak value of rush current generated by the application of fixed voltage.

17. The method of claim 16, wherein the pulse cycle and the first duty value are set so that the peak electrical current during the interval in which the electrical current is on becomes ⅔ of the peak value of the rush current generated by the application of fixed voltage.

18. The method of claim 12, wherein the first time interval is a time interval that exceeds a time interval which shows that rush current generated by the application of fixed voltage is a larger value than stationary current.

* * * * *